(12) United States Patent
Johnson

(10) Patent No.: US 6,842,204 B1
(45) Date of Patent: Jan. 11, 2005

(54) COLOR DISPLAY SYSTEM FOR NVIS CLASS A COMPATIBILITY

(75) Inventor: Rick J. Johnson, Marion, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 10/236,973

(22) Filed: Sep. 6, 2002

(51) Int. Cl.[7] ............................................. G02F 1/1347
(52) U.S. Cl. .............................. 349/74; 349/61; 349/68
(58) Field of Search ................................ 349/61, 64–65, 349/68, 74; 362/230, 800; 348/148, 162, 164

(56) References Cited

U.S. PATENT DOCUMENTS

| | | | | |
|---|---|---|---|---|
| 5,661,578 A | * | 8/1997 | Habing et al. ................. | 349/65 |
| 6,419,372 B1 | * | 7/2002 | Shaw et al. .................. | 362/231 |
| 6,574,030 B1 | * | 6/2003 | Mosier ........................ | 359/267 |
| 6,653,798 B2 | * | 11/2003 | Guthrie et al. ........... | 315/200 A |
| 6,714,186 B1 | * | 3/2004 | Mosier et al. .............. | 345/104 |

FOREIGN PATENT DOCUMENTS

EP 0615151 A1 * 9/1994 ......... G02F/1/1335

* cited by examiner

Primary Examiner—Michael G. Lee
Assistant Examiner—Seung H Lee
(74) Attorney, Agent, or Firm—Nathan O. Jensen; Kyle Eppele

(57) ABSTRACT

The disclosure is directed to a full color liquid crystal display system providing compatibility with Class A night vision imaging goggles. One embodiment of the invention is directed to a color liquid crystal display (LCD) having dual modes of operation. The color LCD display includes a normal mode light source, a liquid crystal display stack positioned so as to receive light from the normal mode light source, and a night vision imaging system (NVIS) mode light source. The NVIS mode light source includes a NVIS mode white light source, a NVIS mode red light source, a NVIS filter receiving light from both the NVIS mode white light source and the NVIS mode red light source, and a waveguide receiving light from the NVIS filter for reflection to the LCD stack.

23 Claims, 2 Drawing Sheets

COLOR DISPLAY SYSTEM FOR NVIS CLASS A COMPATIBILITY

BACKGROUND

The present application relates generally to the field of liquid crystal displays including a backlight. More particularly, the application relates to a liquid crystal display including a dual mode backlight that is compatible with night vision imaging system (NVIS) Class A requirements.

Liquid crystal displays (LCDs) are desirable for use as display means in air vehicle cockpits. LCDs provide high definition, bright displays readable under both low light and full sunlight conditions. LCD producers are facing increasing demand for LCDs having premium features. One example of a premium feature is night vision imaging system (NVIS) compatibility.

A night vision imaging system allows the pilot or operator to use night vision imaging goggles while flying the aircraft. Night vision imaging goggles are sensitive to light primarily in the red to near-infrared wavelengths, approximately 610 nanometers (nm) to 930 nm in the color spectrum (the night vision spectrum). Night vision imaging goggles allow the pilot to view outside conditions in low light using light in the night vision spectrum, allowing aircraft operation during nighttime conditions.

However, it is important to ensure that aircraft LCD display systems provided in an aircraft are compatible with the use of night vision imaging goggles. If the light out from the LCD display is within the night vision spectrum and therefor viewable by the night vision goggles, the light output from the display can be seen reflecting off the canopy, degrading goggle performance and pilot vision. Incompatible lights make the outside scene less visible with the goggles. Additionally, changing illumination can affect visual acuity. Finally, external incompatible light from the ambient environment can result in "washout" or halo effects, when using the goggles. This could result in glare, flash blindness, and afterimage for the pilot.

A NVIS compatible display provides light output that does not include light having a wavelength viewable by night vision imaging goggles. The NVIS compatible display must provide light outside the night vision spectrum with sufficient luminance to be visible. It is also desirable to have a means to reduce the luminance output of the LCD displays compared with daytime operation to reduce overall visibility and canopy reflection. However, the same display must continue to function as a standard display during daytime operation, wherein bright illumination is required so that the display is visible even in bright sunlight.

In addition, there are two types of NVIS compatibility, Class A compatibility and Class B compatibility. The NVIS Class B response curve is from approximately 630 nm to approximately 910. The NVIS Class A response curve is from approximately 610 nm to approximately 910 nm. The Class A response curve reaches lower into the color spectrum, requiring more filtering than is required for Class B compatibility. Filtering more of the color spectrum can be accomplished using an NVIS Class A filter positioned between a white light source and the LCD stack to filter light above 610 nm.

Traditionally, cockpit displays have relied on light source dimming combined with filtering to minimize emissions. Although using a NVIS filter will filter the required spectrum of light, it has the effect of filtering red content from the display image. Filtering has the effect of reducing emissions between 630 and 900 nm while transmitting light within the visible range. Thus, the red in the display image is reduced during daylight operation, and the display is no longer a full color display. The red color in an image appears to be less saturated or more orange than the "true" image. Lack of a full color display can be problematic in a display wherein color is used as an indication means. An example can be a weather condition display wherein red colors indicate severe weather.

Therefore, there is a need for a full color display that is NVIS Class A compatible. Further, there is a need for such a display wherein the red emission is not compromised during daylight viewing, such that the display is a full color display.

SUMMARY OF THE INVENTION

One embodiment of the invention relates to a color display having dual modes of operation. The color LCD display includes a normal mode light source, a display element positioned so as to receive light from the normal mode light source, and a night vision imaging system (NVIS) mode light source. The NVIS mode light source includes a NVIS mode white light source, a NVIS mode red light source, a NVIS filter receiving light from both the NVIS mode white light source and the NVIS mode red light source, and a light redirection device receiving light from the NVIS filter for redirection to the LCD stack.

Another embodiment of the invention relates to a color liquid crystal (LCD) display. The color LCD display includes a white light source, a red light source, a night vision imaging system (NVIS) filter receiving light from both the white light source and the red light source, and a liquid crystal display stack positioned to receive light from the diffuser.

An additional embodiment of the invention relates to a method for lighting a full color liquid crystal display. The method includes providing a white light source and a red light source. The method further includes providing a NVIS filter to receive a light input from the white light source and the red light source and filter the light input to remove light having a wavelength above 610 nm.

BRIEF DESCRIPTION OF THE DRAWINGS

The invention will become more fully understood from the following detailed description, taken in conjunction with the accompanying drawings, wherein like reference numerals refer to like elements, and in which.

DETAILED DESCRIPTION OF THE PREFERRED EMBODIMENTS

Figure 1:
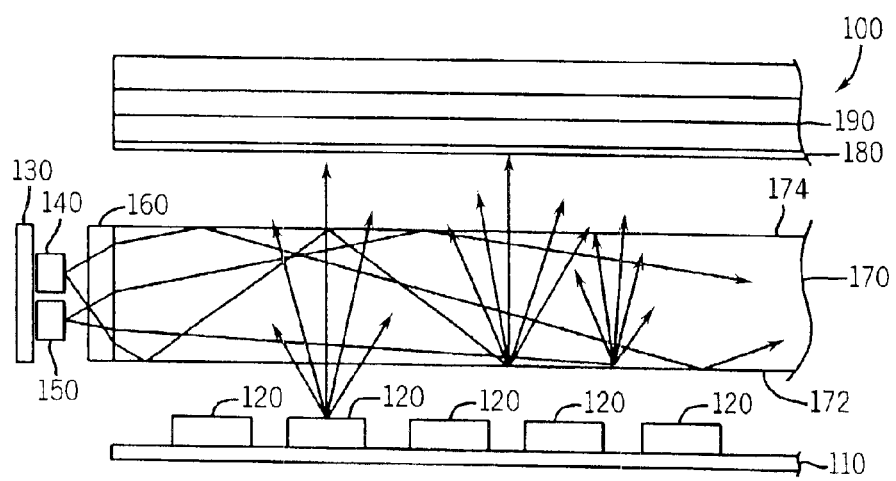
FIG. 1 is a cross sectional view of a liquid crystal display unit 100 including dual modes of operation according to an exemplary embodiment.

FIG. 1 is a cross sectional view of a liquid crystal display unit 100 including dual modes of operation according to an exemplary embodiment. Liquid crystal display unit 100 can include a base 110 including a plurality of normal mode white light sources 120, a wall 130 including a Night Vision Imaging System (NVIS) white light source 140 and a NVIS red light source 150. Liquid crystal display unit 100 can further include a NVIS filter 160, a waveguide 170, a diffuser 180, and a liquid crystal display (LCD) stack 190.

Base 110 can include a plurality of normal mode white light sources 120. According to an exemplary embodiment, normal mode white light sources 120 can be evenly spaced LEDs utilized during Normal Mode operation. Normal Mode operation can be utilized during daylight operation or night operation when the NVIS goggles are not being used. Normal Mode operation is utilized wherein bright illumination of LCD stack 190 is desirable. Bright illumination of LCD stack 190 is desirable to make the display visible during daylight operation, such that the display is readable even in direct sunlight. According to an exemplary embodiment, illumination requirements for normal mode operation can be between approximately 0.05 foot-Lamberts and 250 foot Lamberts, Accordingly, Normal mode white light sources 120 can provide sufficient illumination such that the light output, after passing through LCD stack 190, satisfies illumination requirements for both day and night operation. According to an alternative embodiment, normal mode white light sources 120 can be replaced any other type of light emitting source, including a single light emitting source, such as, but not limited to, a serpentine hot cathode fluorescent tube, an incandescent light source, or a halogen light source.

Wall 130 can include NVIS white light source 140 and NVIS red light source 150. NVIS White light source 140 can be any white light source projecting light through NVIS filter 160 along waveguide 170. Although NVIS white light source 140 is shown as a light emitting diode, according to alternative embodiments, NVIS White light source 140 can be any type of light source such as, but not limited to, a fluorescent, incandescent, or halogen light source.

NVIS red light source 150 can be any light source projecting light within the spectrum from approximately 580 nm to 620 nm through NVIS filter 160 along waveguide 170. Although NVIS red light source 150 is shown as a light emitting diode, according to alternative embodiments, NVIS red light source 150 can be any type of light source projecting light within the spectrum from approximately 580 nm to 620 nm such as, but not limited to, a fluorescent, incandescent, or halogen light source.

NVIS filter 160 can be any type of light filter capable of absorbing or reflecting lamp emissions between 610 nm and 930 nm and having good transmission for visible wavelengths between 440 nm and 610 nm. Examples of NVIS filters can include, but are not limited to, absorptive glass or dichroic hot mirrors.

Waveguide 170 can be made from glass or optical plastic that transmits visible light. For a LCD with a 6 inch by 8 inch active area, the waveguide may be approximately 6 inches by 8 inches by 0.25 inches thick. In operation, waveguide 170 receives light input from NVIS white light source 140 and NVIS red light source 150 along one or more of the edges proximate to the NVIS light sources. Typically, light is reflected along the length and width of the waveguide until it hits a portion of the bottom surface which has been designed to scatter light out of the waveguide and through the display.

According to an exemplary embodiment, waveguide 170 can include a bottom internal edge 172 and a top internal edge 174. Bottom internal edge 172 can be coated with white paint to scatter the light as it is reflected from bottom internal edge 172. In operation, the light scattered by bottom internal edge 172 will pass through top internal edge 174 to diffuser 180 as the scattered light exceeds the angle of reflection of top internal edge 174. Waveguide 170 may alternatively include other devices which are configured to redirect light.

Diffuser panel 180 can be a LCD backlight diffuser panel, which spreads light evenly and reduces brightened or darkened areas. Diffuser 180 can receive light and scatter the light to reduce features of the light source and provide a uniform light source to blacklight LCD stack 190. As the light travels, it is deflected out the top and toward LCD stack 190. LCD Stack 190 can be any type of liquid crystal display stack.

According to an exemplary embodiment, in a normal mode of operation, the normal mode white light sources 120 can be used exclusively to provide illumination to LCD stack 190. Because NVIS filter 160 is not positioned between normal mode white light sources 120 and LCD stack 190, there is no problem with degradation of red output in the display image.

According to an exemplary embodiment, in a NVIS mode of operation, normal mode white light sources 120 are turned off and NVIS white light source 140 and NVIS red light source 150 are used for illumination of liquid crystal display unit 100. The light from the NVIS mode light sources is filtered by NVIS filter 160 to remove light in the spectral range above approximately 620 nm. This filtering renders the output from liquid crystal display unit 100 Class A compatible. Additionally, combining the light input from NVIS white light source 140 and NVIS red light source 150 has the effect of producing a full color display even during operation in NVIS mode. As described below with reference to FIG. 2, NVIS red light source 150 provides red light output having a wavelength below the night vision spectrum range, such that there is no degradation of red output in the display image.

Figure 2:
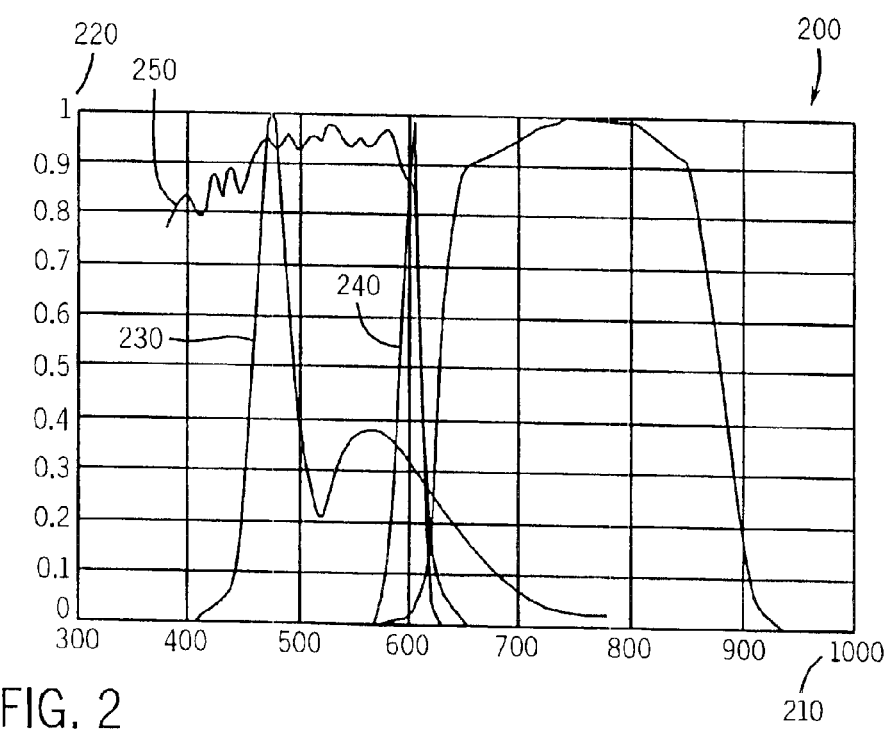
FIG. 2 is a graph showing spectral data for liquid crystal display system 100 according to an exemplary embodiment.

FIG. 2 is a graph 200 showing spectral data for liquid crystal display unit 100 according to an exemplary embodiment. Graph 200 includes a bottom metric 210 indicating wavelengths in the electromagnetic spectrum, ranging from 300 nm (ultraviolet light) to 1000 nm (infrared light) and a side metric 220. Side metric 220 is a metric having different representations based on the values being graphed. The metric values are described below with reference to the curves being displayed A Normalized White LED Spectral Output Curve 230 illustrates that a white LED light outputs light having wavelengths from approximately 410 nm extending well into the infrared range. A Normalized Red LED Spectral Output Curve 240 shows illustrates that a red LED light outputs light having wavelengths from approximately 580 nm to 620 nm. For the LED spectral output curves, side metric 220 indicates the relative spectral emission intensity.

A NVIS Filter Transmission Curve 250 shows the wavelength output and transmission rate of light transmitted after passing through a NVIS filter. For a filter value graph, side metric 220 indicates a transmission rate with 1.0 indicate unimpeded transmission, and 0 indicating blocked transmission.

A NVIS Class A Response Curve 260 shows the relative spectral response curve for Class A compatible night vision goggles. For the, NVIS Class A Response Curve, side metric 220 indicates the relative spectral response of Class A NVIS.

As can be seen, Normalized White LED Spectral Output Curve 230 extends well into the infrared range and well into the range of NVIS Class A Response Curve 260. Consequently, unfiltered light emitted from NVIS white light source 140 would be visible using the Class A compatible night vision goggles. The visible light could reflect off a canopy or be viewed directly by the Class A compatible night vision goggle user causing reduced performance or a "bloom" wherein to much light enters the Class A compatible night vision goggles causing a large white area of the display having zero visibility.

However, NVIS Filter Transmission Curve 250 is a transmission curve showing the light transmission rate of NVIS filter 160. As can been seen in NVIS Class A Response Curve 260, a full spectrum of visible light is transmitted, but the output is almost completely blocked at wavelengths above 610 nm. This has the effect of creating a full color display for viewing in daylight conditions or without the night vision goggles that does not interfere with Class A compatible night vision goggles.

Figure 3:
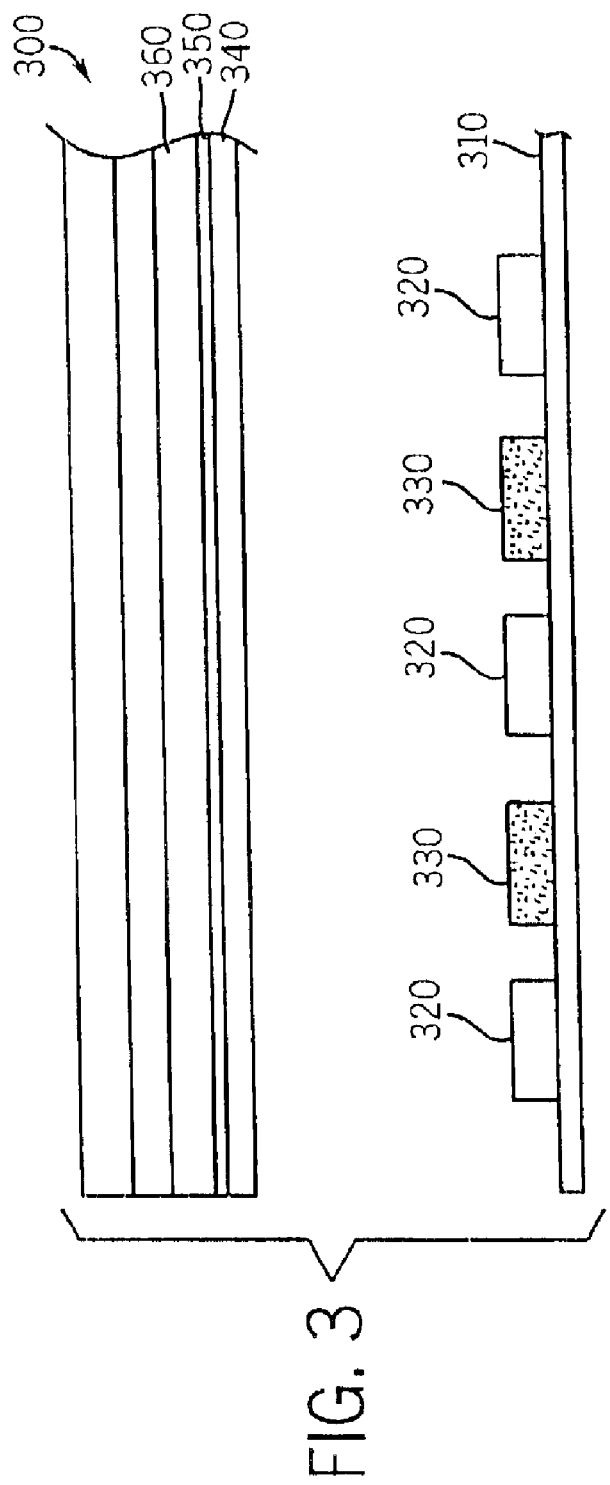
FIG. 3 is a cross sectional view of a liquid crystal display unit 100 according to an exemplary embodiment.

FIG. 3 shows an alternative embodiment of a liquid crystal display unit 300. Liquid crystal display unit 300 includes a base 310, similar to base 110. Base 310 can include both white light sources 320, similar to NVIS white light source 140, and red light sources 330, similar to a NVIS red light source 150. Liquid crystal display unit 300 can further include a NVIS filter 340, similar to NVIS filter 160, a diffuser 350, similar to diffuser 180, and a LCD stack 360, similar to LCD stack 180.

In operation, liquid crystal display unit 300 features only a single mode of operation similar to the NVIS mode of operation described above. The output of white light sources 320 and red light sources 330 passes through NVIS filter 340 such that the wavelength of the light that passes through LCD stack 360 includes the full spectrum of visible light, such that the display will be a full color display but does not include light with a wavelength greater than approximately 610 nm.

According to an exemplary embodiment, the luminance output of white light sources 320 and red light sources 330 can be variable. A variable luminance output allows the output to be maximized during daylight operation and minimized during nighttime operation.

While the exemplary embodiments illustrated in the FIGURES and described above are presently preferred, it should be understood that these embodiments are offered by way of example only. For example, alternative embodiments may be suitable for use, en example is wherein the source of red light is a fluorescent lamp. Accordingly, the present invention is not limited to a particular embodiment, but extends to various modifications that nevertheless fall within the scope of the appended claims.

What is claimed is:

1. A color display having dual modes of operation, comprising:
   a normal mode light source;
   a display element positioned so as to receive light from the normal mode light source; and
   a night vision imaging system (NVIS) mode light source, including:
   a NVIS mode white light source;
   a NVIS mode red light source;
   a NVIS filter receiving light from both the NVIS mode white light source and the NVIS mode red light source; and
   a light redirection device receiving light from the NVIS filter for redirection to the display element.

2. The color display of claim 1, wherein the display element is a liquid crystal display stack.

3. The color display of claim 2, further including a diffuser panel positioned between the LCD stack and the normal mode light source and NVIS mode light sources.

4. The color display of claim 1, wherein the NVIS filter filters light having a wavelength greater than approximately 610 nm.

5. The color display of claim 1, wherein the red light source provides illumination such that the light output from the display element is full color.

6. The color display of claim 1, wherein the light output from the display element does not include light with a wavelength greater than approximately 610 nm.

7. The color display of claim 1, wherein the NVIS white light, NVIS red light source, and normal mode light sources include light emitting diodes.

8. The color display of claim 1, wherein the NVIS red light source is individually powered such that the luminance output of the NVIS red light source can be individually controlled.

9. The color display of claim 1, wherein the red light source provides light having a wavelength less than 610 nm.

10. A color liquid crystal display (LCD), comprising
    a white light source;
    a red light source;
    a night vision imaging system (NVIS) filter receiving light from both the white light source and the red light source; and
    a liquid crystal display stack positioned to receive light from the diffuser.

11. The color LCD display of claim 9, further including a diffuser panel positioned between the NVIS filter and the liquid crystal display stack so as to receive light from the NVIS filter and transmit light to the liquid crystal display stack.

12. The color LCD display of claim 9, wherein the NVIS filter filters light having a wavelength greater than 610 nm.

13. The color LCD display of claim 9, wherein the red light source provides illumination such that the light output from the LCD stack include all of the wavelengths in the visible spectrum having a wavelength less than 610 nm.

14. The color LCD display of claim 9, wherein the light output from the LCD stack does not include light having a wavelength greater than 610 nm.

15. The color LCD display of claim 9, wherein the NVIS white light, the NVIS red light source, and the normal mode light sources are light emitting diodes.

16. The color LCD display of claim 9, wherein the NVIS red light source is individually powered such that the luminance output of the NVIS red light source can be individually controlled.

17. The color LCD display of claim 9, wherein the red light source outputs light having a wavelength less than 610 nm.

18. A method for lighting a full color liquid crystal display, comprising:
    providing a white light source;
    providing a red light source; and
    providing a NVIS filter to receive a light input from the white light source and the red light source and filter the light input to remove light having a wavelength greater than 610 nm.

19. The method of claim 18, further including providing the output from the NVIS filter to a LCD stack.

20. The method of claim 18, further including providing a diffuser positioned between the NVIS filter and the LCD stack.

21. The method of claim 18, wherein the luminance output from the red light source is variable.

22. The method of claim 18, wherein the light from the red light source has a wavelength less than 610 nm.

23. The method of claim 18, wherein the luminance output from the white light source is variable.

* * * * *